(12) United States Patent
Calgotra et al.

(10) Patent No.: US 9,667,038 B2
(45) Date of Patent: May 30, 2017

(54) SHIELDING ASSEMBLY

(71) Applicant: ALSTOM Technology Ltd, Baden (CH)

(72) Inventors: Sarb Calgotra, Wolverhampton (GB); Michael Evans, Stafford (GB); Colin Charnock Davidson, Stafford (GB)

(73) Assignee: General Electric Technology GmbH, Baden (CH)

( * ) Notice: Subject to any disclaimer, the term of this patent is extended or adjusted under 35 U.S.C. 154(b) by 187 days.

(21) Appl. No.: 14/402,631

(22) PCT Filed: May 23, 2013

(86) PCT No.: PCT/EP2013/060655
§ 371 (c)(1),
(2) Date: Nov. 20, 2014

(87) PCT Pub. No.: WO2013/174939
PCT Pub. Date: Nov. 28, 2013

(65) Prior Publication Data
US 2015/0109709 A1    Apr. 23, 2015

(30) Foreign Application Priority Data

May 24, 2012  (EP) .................................... 12275077

(51) Int. Cl.
*H02B 5/00*    (2006.01)
*H01T 19/00*    (2006.01)

(52) U.S. Cl.
CPC ............... *H01T 19/00* (2013.01); *H02B 5/00* (2013.01)

(58) Field of Classification Search
CPC ................................. H01T 19/00; H02B 5/00
See application file for complete search history.

(56) References Cited

U.S. PATENT DOCUMENTS

| 2,242,092 | A | | 5/1941 | Schultz |
| 3,530,264 | A | | 9/1970 | Gorin et al. |
| 3,697,819 | A | * | 10/1972 | Eichelberger .......... H02B 13/02 200/48 R |
| 4,593,339 | A | | 6/1986 | Robinson |
| 4,697,305 | A | * | 10/1987 | Boothe ..................... E06C 1/32 16/329 |
| 2004/0007951 | A1 | | 1/2004 | Holighaus et al. |

FOREIGN PATENT DOCUMENTS

| CN | 1469519 A | 1/2004 |
| EP | 2 395 616 A1 | 12/2011 |
| KR | 10-0186355 B1 | 12/1998 |

OTHER PUBLICATIONS

English-language machine translation KR 10-0186355, LS Ind. Systems Co. Ltd. (Dec. 29, 1998).
International Search Report and Written Opinion for PCT Application No. PCT/EP2013/060655, mailed Aug. 8, 2013, 7 pages.

* cited by examiner

*Primary Examiner* — Thienvu Tran
*Assistant Examiner* — Tien Mai
(74) *Attorney, Agent, or Firm* — Foley & Lardner LLP

(57) ABSTRACT

An electrical field shielding assembly comprises at least one electrically conductive, shielding element (12) that is hingably mounted on the electrical field shielding assembly, wherein the or each shielding element (12) is hingably movable between an open position in which an access opening in the electrical field shielding assembly is created and a closed position in which the access opening in the electrical field shielding assembly is closed.

13 Claims, 12 Drawing Sheets

SHIELDING ASSEMBLY

CROSS REFERENCE TO RELATED APPLICATIONS

The present application is a National Stage of International Application No. PCT/EP2013/060655, filed May 23, 2013, which claims priority to European Application No. 12275077.1, filed May 24, 2012, which is incorporated herein by reference in its entirety.

This invention relates to an electrical field shielding assembly.

The application of an electrical potential difference between a conductor and some other object results in the creation of an electrical field about the conductor. The existence of this electrical field can lead to electrical breakdown. This is problematic when the conductor is a piece of electrical equipment, and particularly problematic when the conductor is a piece of high voltage electrical equipment.

Electrical breakdown occurs when the dielectric strength of the medium surrounding a conductor is exceeded. Partial breakdown initially occurs when the medium surrounding the conductor ionizes, forming a plasma, and permits the conduction of an electric current. As a result corona discharge occurs in the immediate vicinity of the conductor, which can be observed in the form of electromagnetic radiation, audible noise or gaseous contaminants such as ozone. If the electrical stress is high enough, complete breakdown occurs, resulting in sparking or arcing from the conductor. The electrical discharge caused by either full or partial breakdown results in damage to, or the failure of, the electrical equipment.

Edges and pointed features of a conductor are considered critical regions that are particularly prone to electrical breakdown because the electrical stress tends to be higher in the immediate vicinity of these regions.

The problems associated with electrical discharge from electrical equipment are often resolved by shielding the electrical equipment with an electrical field shielding assembly i.e. a corona shield. The purpose of a corona shield is to redistribute the electrical field lines surrounding the electrical equipment across a surface of relatively large curvature, particularly in the vicinity of critical regions including edges and pointed features. This reduces the electrical stress about the electrical equipment and therefore reduces the risk of electrical breakdown.

According to an aspect of the invention, there is provided an electrical field shielding assembly, for high voltage electrical equipment, comprising at least one electrically conductive, shielding element that is hingably mounted on the electrical field shielding assembly which in use houses electrical equipment, wherein the or each shielding element is hingably movable between an open position in which an access opening in the electrical field shielding assembly is created through which the electrical equipment is accessible and a closed position in which the access opening in the electrical field shielding assembly is closed, the electrical field shielding assembly further including at least one first hinge member, and the or each shielding element including a second hinge member, the or each second hinge member being hingably coupled with the first hinge member or a respective one of the first hinge members, and the or each first hinge member including:

a locking portion to inhibit rotation of the corresponding second hinge member relative to the first hinge member, and a pivot portion to permit rotation of the corresponding second hinge member relative to the first hinge member, wherein the or each second hinge member is selectively movable between a locked position in which the or each second hinge member is lockably coupled with the corresponding locking portion, and a pivot position in which the or each second hinge member is rotatably coupled with the corresponding pivot portion.

In use, electrical equipment is housed inside the electrical field shielding assembly. In particular, the or each shielding element is arranged around the electrical equipment in order to distribute electrical field lines surrounding the electrical equipment during its operation.

It is important to be able to access the electrical equipment to carry out maintenance and repair. For example, when the electrical equipment is a voltage source converter (VSC), access to the VSC may be required in order to remove and replace sub-modules of the VSC. This is achieved by moving the or each shielding element in order to create an access opening in the electrical field shielding assembly that is large enough for a user to access the electrical equipment.

Hingably mounting the or each shielding element on the electrical field shielding assembly permits hinged movement of the or each shielding element relative to the electrical field shielding assembly in order to create an access opening in the electrical field shielding assembly.

When the or each shielding element is hingably moved to create an access opening in the electrical field shielding assembly, the or each shielding element remains secured to the electrical field shielding assembly. This prevents the or each shielding element from being accidentally dropped, which may cause damage to itself or other components in the vicinity of the electrical field shielding assembly. This is particularly advantageous in tall electrical field shielding assemblies with large and heavy shielding elements that are positioned at a high location relative to the ground. Damage to the or each shielding element is undesirable, since a change in shape of the or each shielding element may lead to a redistribution of the electrical field lines that results in high electrical stress about the electrical equipment. Hingably mounting the or each shielding element on the electrical field shielding assembly therefore reduces the risk of damage to the or each shielding element during maintenance and repair of the electrical equipment.

In contrast, fasteners, such as bolts, are conventionally used to releasably secure a shielding element to an electrical field shielding assembly. The use of such fasteners not only requires physical handling of the or each shielding element, but also requires the shielding element to be completely detached from the electrical field shielding assembly in order to create an opening for access to the electrical equipment. As such, there is a risk that the shielding element and the fastener(s) may be accidentally dropped during maintenance and repair of the electrical equipment.

The provision of at least one electrically conductive, shielding element that is hingably mounted on the electrical field shielding assembly therefore results in an electrical field shielding assembly with at least one shielding element that is movable to provide access to electrical equipment housed, in use, inside the electrical field shielding assembly, whilst being secured to the electrical field shielding assembly at all times.

In order to arrange the or each shielding element around the electrical equipment, the second hinge member of the or each shielding element is moved to a locked position. When the second hinge member is in the locked position, the coupling between the second hinge member and the locking portion prevents rotation of the second hinge member relative to the first hinge member. This allows the or each shielding element to maintain its position relative to the electrical equipment in order to ensure proper distribution of the electrical field lines during operation of the electrical equipment.

In order to create the opening, the second hinge member of the or each shielding element is moved to a pivot position. When the second hinge member is in the pivot position, the coupling between the second hinge member and the locking portion permits rotation of the second hinge member relative to the first hinge member. This allows the or each shielding element to be hingably moved to create the opening in the electrical field shielding assembly.

The or each shielding element may be shaped and/or arranged in different ways depending on the shielding requirements of the electrical field shielding assembly. For example, the or each shielding element is shaped and/or arranged to form at least part of a hollow enclosure when in the closed position.

The shape of the pivot and locking portions of the or each first hinge member may vary to carry out their respective function. For example, the or each pivot portion may be cylindrical, so as to permit rotation of the second hinge member relative to the first hinge member, and/or the or each locking portion may be non-cylindrical, so as to inhibit rotation of the second hinge member relative to the first hinge member.

When the or each locking portion is non-cylindrical, the or each locking portion may include at least one faceted edge. The orientation of the or each faceted edge may be directed to position the or each shielding element so as to define a specific shape of the electrical field shielding assembly. For example, the or each shielding element may be kept in parallel with the electrical equipment housed within the electrical field shielding assembly.

The shape and configuration of the first and second hinge members may vary in order to rotatably couple the second hinge member and the corresponding pivot portion when the or each second hinge member is in the pivot position, and lockably couple the second hinge member and the corresponding locking portion when the or each second hinge member is in the locked position.

For example, in embodiments of the invention employing the use of first and second hinge members, the or each second hinge member may include a tubular portion that encloses the corresponding first hinge member. In such embodiments wherein the or each second hinge member includes a tubular portion, the tubular portion of the or each second hinge member may be slidably coupled with the corresponding first hinge member.

In embodiments employing the use of the or each second hinge member with a tubular portion, the first and second hinge members may be shaped to define a gap between the tubular portion and the pivot portion when the second hinge member is in the pivot position, the gap being sized to permit rotation of the second hinge member relative to the first hinge member.

In further embodiments employing the use of the or each second hinge member with a tubular portion, the first and second hinge members may be shaped to keep the locking portion lockably retained within the tubular portion when the second hinge member is in the locked position.

Preferably the or each first hinge member further includes a stopping portion with a first abutment surface to engage the corresponding second hinge member so as to keep the corresponding second hinge member in coupling with the pivot portion when the second hinge member is in the pivot position.

The inclusion of a stopping portion in the or each first hinge member prevents the corresponding second hinge member from being detached from the first hinge member when the second hinge member is rotating relative to the first hinge member.

In embodiments of the invention, the electrical field shielding assembly may further include at least one support member, the or each shielding element being hingably connected to the support member or a respective one of the support members, the or each support member being movably connected to the electrical field shielding assembly, wherein the or each support member is selectively movable between a retracted position towards the electrical field shielding assembly and an extended position away from the electrical field shielding assembly. In such embodiments, the or each support member may be slidably connected to the electrical field shielding assembly.

The inclusion of at least one support member in the electrical field shielding assembly allows formation of a clearance gap between a shielding element and the rest of the electrical field shielding assembly before the shielding element is hingably moved to the open position in which the access opening in the electrical field shielding assembly is created. This not only reduces the risk of the shielding element colliding with other parts of the electrical field shielding assembly during its rotation, but also allows the shielding element to have a wider hinged movement range to create a larger access opening in the electrical field shielding assembly.

In addition, the use of at least one support member in the electrical field shielding assembly allows the or each shielding element to be kept close to the electrical equipment by moving the or each support member to its retracted position, without restricting the maximum hinged movement range of the or each shielding element when the or each support member is in its extended position.

In further embodiments of the invention, the electrical field shielding assembly may further include at least one second abutment surface to engage the or each shielding element so as to limit a maximum hinged movement range of the or each shielding element relative to the electrical field shielding assembly. In such embodiments employing the use of at least one second abutment surface and at least one support member, the or each support member may define the second abutment surface or a respective one of the second abutment surfaces.

The configuration of the electrical field shielding assembly in this manner prevents collision between the or each shielding element and other parts of the electrical field shielding assembly as a result of over-movement of the or each shielding element.

A preferred embodiment of the invention will now be described, by way of a non-limiting example, with reference to the accompanying drawings in which:

FIGS. 1b and 1c show close-up views of part of the electrical field shielding assembly of FIG. 1a;

FIG. 2a shows a first hinge member that forms part of the electrical field shielding assembly of FIG. 1a;

FIG. 2b shows a shielding element with a second hinge member that is hingably coupled to the first hinge member of FIG. 2a;

FIG. 5b shows a configuration of the first and second hinge members of FIG. 5a;

FIG. 6b shows a configuration of the first and second hinge members of FIG. 6a;

FIG. 7b shows a configuration of the first and second hinge members of FIG. 7a.

Figure 1A:
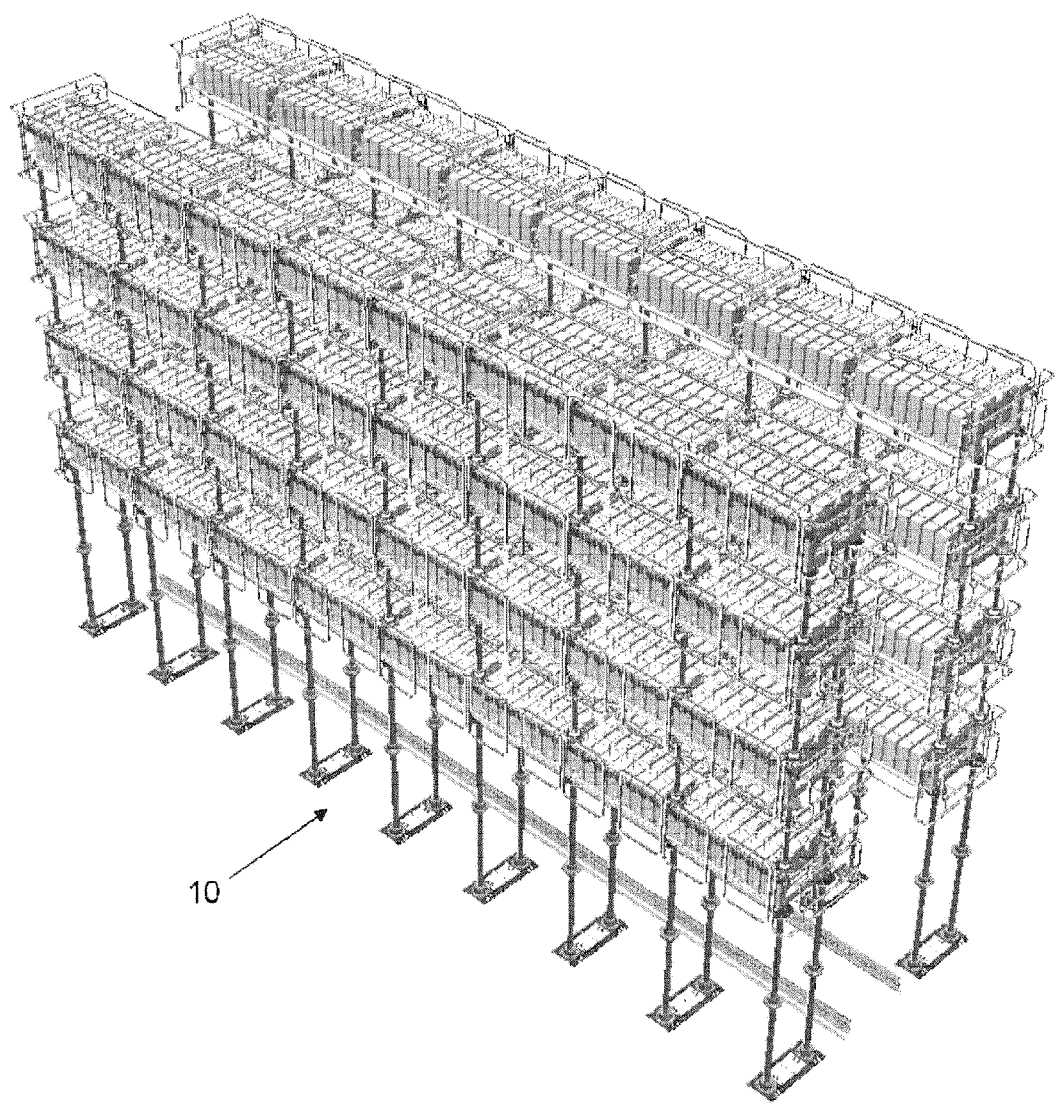
FIG. 1a shows an electrical field shielding assembly according to an embodiment of the invention.
Figure 1B:
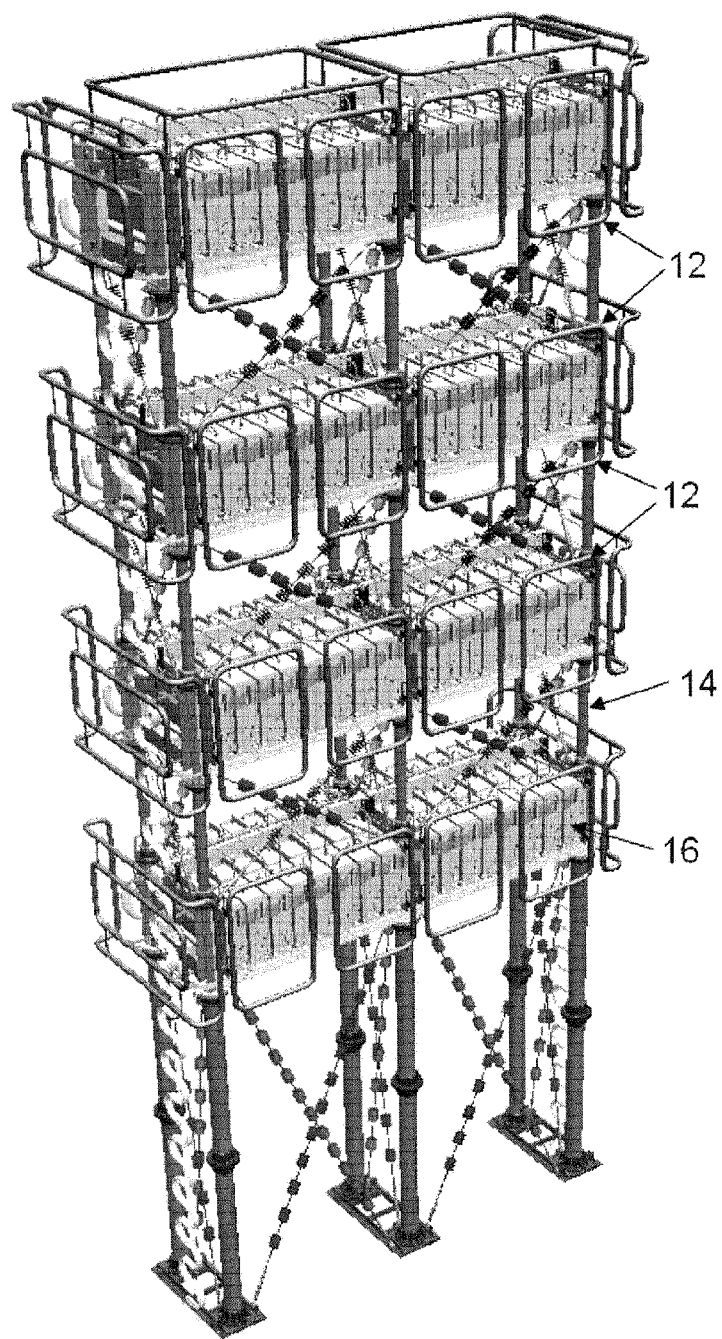
Figure 1C:
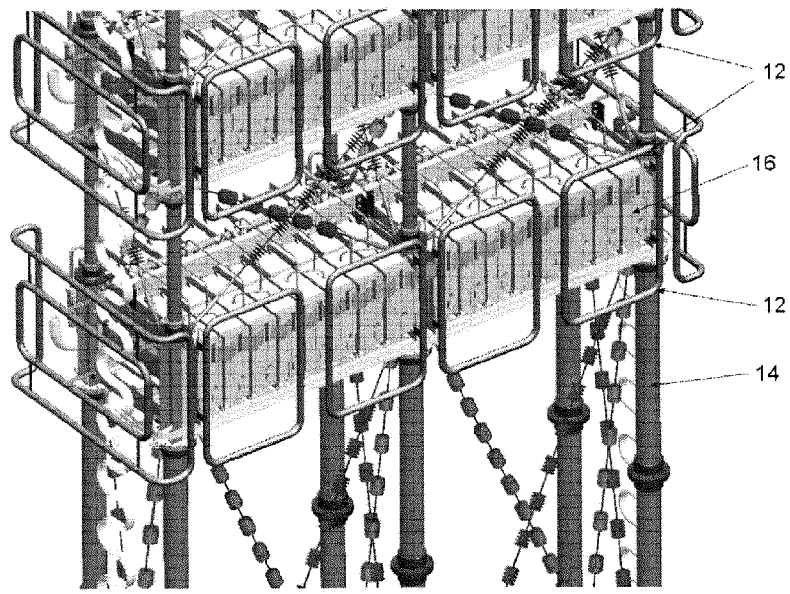

An electrical field shielding assembly 10 according to an embodiment of the invention is shown in FIGS. 1a, 1b and 1c.

The electrical field shielding assembly 10 comprises a plurality of electrical conductive, shielding elements 12, and a base 14.

In use, voltage source converter (VSC) sub-modules 16 are housed inside the electrical field shielding assembly 10 and supported by the base 14. In particular, each shielding element 12 is arranged around the VSC sub-modules 16 in order to distribute electrical field lines surrounding the VSC sub-modules 16 during its operation.

The arrangement of the plurality of shielding elements 12 around the VSC sub-modules 16 may vary depending on the shape and electrical characteristics of the VSC sub-modules 16.

It is envisaged that, in use, other types of electrical equipment may be housed inside the electrical field shielding assembly 10.

Figure 2A:
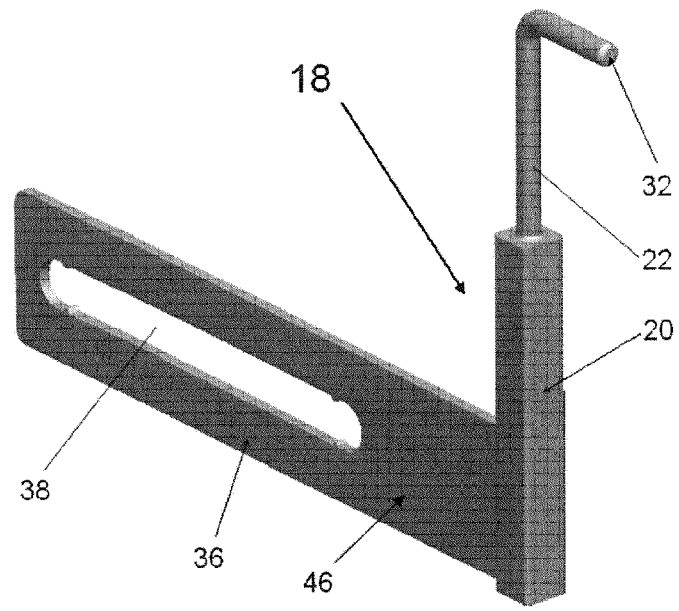

The electrical field shielding assembly 10 further includes a plurality of first hinge members 18. Each first hinge member 18 includes a locking portion 20 and a pivot portion 22, as shown in FIG. 2a. The locking portion 20 defines a first rod portion with a square cross-section, while the pivot portion 22 defines a second rod portion with a circular cross-section, i.e. a cylinder. The locking and pivot portions 20,22 are coaxially aligned and connected end-to-end so as to define a unitary rod.

Each shielding element 12 includes a second hinge member 24. Each second hinge member 24 includes a tubular portion 26, which defines an aperture 28 with a square cross-section.

Figure 2B:
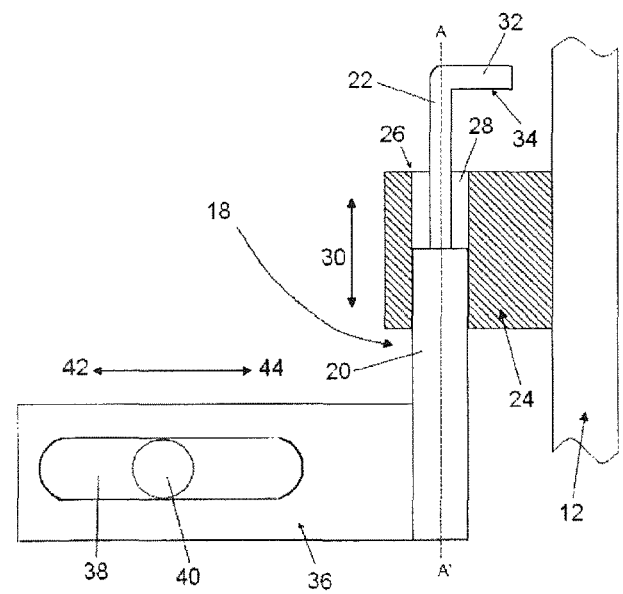
Figure 2C:
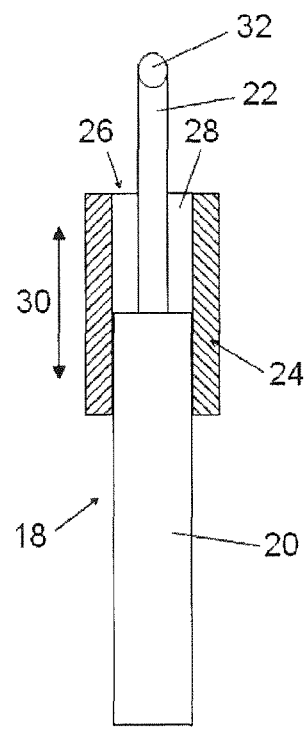
FIG. 2c shows a cross-sectional view of the first and second hinge members along lines A-A' of FIG. 2b.
Figure 3A:
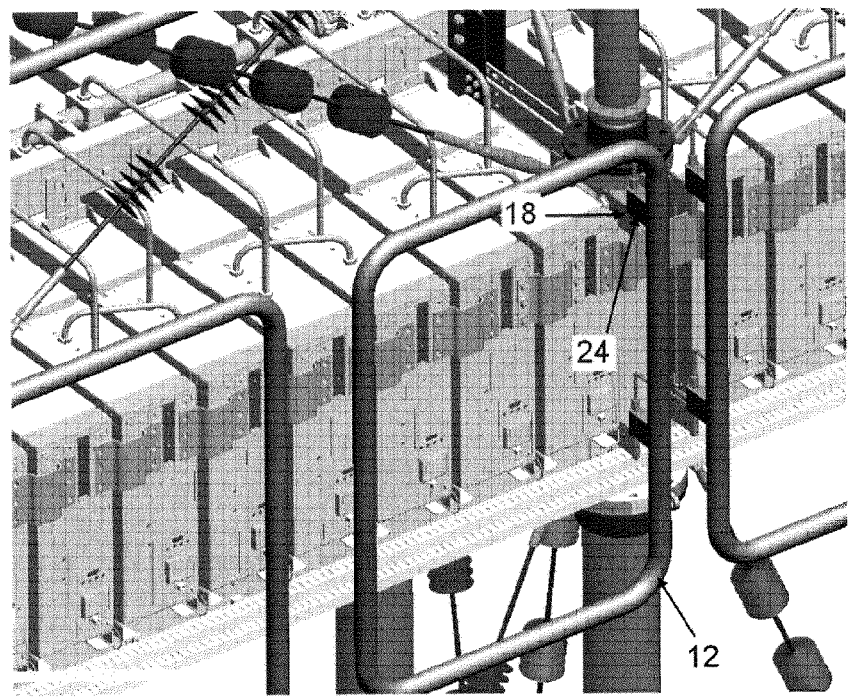
FIGS. 3a and 3b show a configuration of the electrical field shielding assembly of FIG. 1a when the second hinge member is in a locked position and a support member is in a retracted position.
Figure 3B:
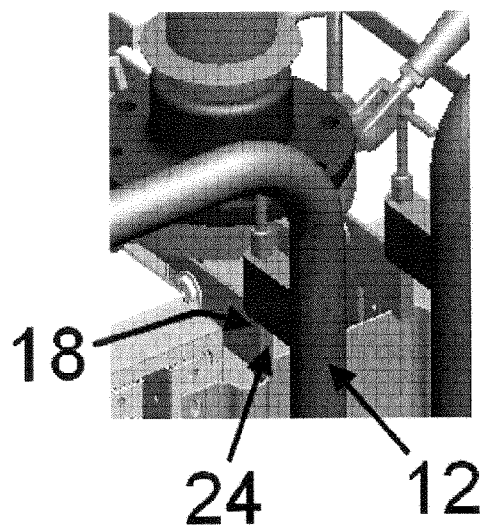
Figure 3C:
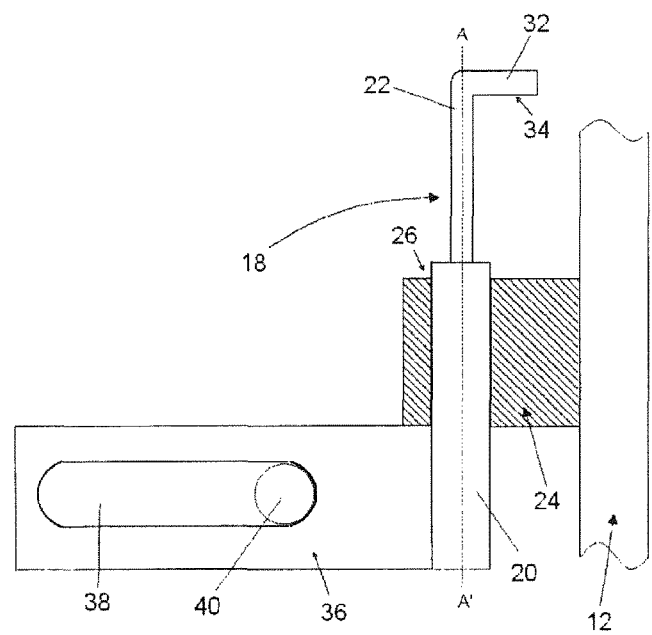
FIG. 3c shows a configuration of the first and second hinge members of FIGS. 3a and 3b.
Figure 3D:
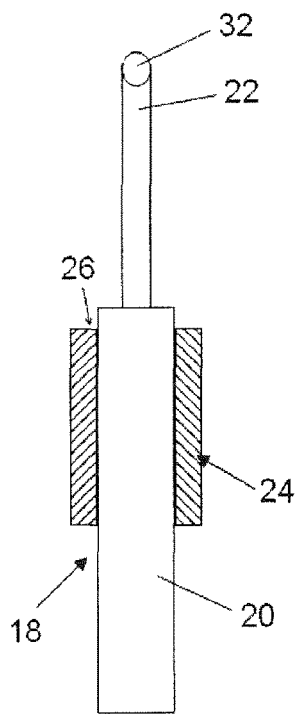
FIG. 3d shows a cross-sectional view of the first and second hinge members along lines A-A' of FIG. 3c.

The second hinge member 24 of each of the plurality of shielding elements 12 is coupled with a respective one of the first hinge members 18 to define a hinge, as shown in FIGS. 2b and 2c. To define the hinge, the tubular portion 26 of the second hinge member 24 encloses the first hinge member 18. The length of the tubular portion 26 is sized so that the second hinge member 24 is selectively slidable 30 along the axes of the locking and pivot portions 20,22 between a locked position in which the tubular portion 26 of the second hinge member 24 encloses the locking portion 20, and a pivot position in which the tubular portion 26 of the second hinge member 24 encloses the pivot portion 22.

The aperture 28 of the tubular portion 26 is sized to fit around the square cross-section of the locking portion 20 so as to inhibit rotation of the second hinge member 24 relative to the first hinge member 18 when the second hinge member 24 is in the locked position. This ensures that the locking portion 20 is lockably retained within the tubular portion 26 when the second hinge member 24 is in the locked position.

The aperture 28 of the tubular portion 26 is also sized to be wider than the circular cross-section of the pivot portion 22 so as to permit rotation of the second hinge member 24 relative to the first hinge member 18, i.e. rotation of the second hinge member 24 about the axes of the locking and pivot portions 20,22, when the second hinge member 24 is in the pivot position.

In this manner, each shielding element 12 is hingably mounted on the electrical field shielding assembly 10, which allows hinged movement of the corresponding shielding element 12 relative to the electrical field shielding assembly 10.

It is envisaged that, in other embodiments, the shape and configuration of the first and second hinge members 18,24 may vary in order to rotatably couple the second hinge member 24 and the pivot portion 22 when the second hinge member 24 is in the pivot position, and lockably couple the second hinge member 24 and the locking portion 20 when the second hinge member 24 is in the locked position. For example, the locking portion 20 may have a different non-cylindrical shape.

Each first hinge member 18 further includes a stopping portion 32. The stopping portion 32 is attached to an axial end of the pivot portion 22 away from the locking portion 20, and extends at a right angle relative to the axes of the locking and pivot portions 20,22. The stopping portion 32 defines a first abutment surface 34 that engages the second hinge member 24 when the second hinge member 24 is in the pivot position and rotated relative to the first hinge member 18. The engagement between the first abutment surface 34 and the second hinge member 24 keeps the second hinge member 24 in coupling with the pivot portion 22. This prevents the second hinge member 24 from being detached from the first hinge member 18 during rotation of the second hinge member 24 relative to the first hinge member 18.

The electrical field shielding assembly 10 further includes a plurality of support members 36. Each support member 36 is hingably connected to a respective one of the shielding elements 12. In particular, each support member is attached to the locking portion 20 of a respective one of the first hinge members 18, and extends at a right angle relative to the axes of the locking and pivot portions 20,22. Each support member 36 includes a groove 38 that encloses a circular guide element 40 of the base 14 of the electrical field shielding assembly 10 to define a sliding connection, in which the circular guide element 40 is slidable within the groove 38 from one end of the groove 38 to the other end. This allows each support member 36 to be selectively moved, in use, between a retracted position 42 towards the base 14 of the electrical field shielding assembly 10 and an extended position 44 away from the base 14 of the electrical field shielding assembly 10.

When each support member 36 is in the retracted position 42, the corresponding shielding element 12 is kept in a designated position, i.e. a closed position, within the electrical field shielding assembly 10 to distribute electrical field lines surrounding the VSC sub-modules 16 during its operation. A locking member (not shown), e.g. in the form of a lever, engages with the locking portion 20 attached to one of the support members 36 to hold the support member 36 in its retracted position 42, and hence hold the corresponding shielding element 12 in its closed position. A portion of the shielding element 12 lying opposite the support members 36 is seated within a retaining member (not shown) which additionally helps to ensure that the whole of the shielding element 12 is retained in its closed position. To this end the retaining member includes a pair of resiliently deformable clamping members (although fewer than or more than two clamping members may be employed), each of which extends partially around the portion of shielding element 12 to engage therewith and hold the shielding element 12 in place. When each support member 36 is in the extended position 44, a clearance gap is formed between the corresponding shielding element 12 and the base 14. This not only reduces the risk of each shielding element 12 colliding with other parts of the electrical field shielding assembly 10 during its rotation, but also allows each second hinge member 24 to have a wider angle of rotation relative to the corresponding first hinge member 18.

When each support member 36 is connected to the base 14 of the electrical field shielding assembly 10, each first hinge member 18 is oriented such that its pivot portion 22 is located on top of its locking portion 20.

A side of each support member 36 defines a second abutment surface 46, which engages the corresponding shielding element 12 to limit the angle of rotation of the second hinge member 24 relative to the first hinge member 18, and thereby limit a maximum hinged movement range of the corresponding shielding element 12 relative to the electrical field shielding assembly 10. Either side of the support member 36 may define the second abutment surface 46 depending on the direction of rotation of the second hinge member 24 relative to the first hinge member 18.

The use of the first and second hinge members 18,24 to hingably mount the plurality of shielding elements 12 on the electrical field shielding assembly 10 allows each shielding element 12 to be hingably moved to create an access opening in the electrical field shielding assembly 10, in order to access the VSC sub-modules 16 for the purposes of maintenance and/or repair. It will be appreciated that access to the VSC sub-modules 16 may be required for reasons other than maintenance and/or repair of the VSC sub-modules 16.

Operation of the first and second hinge members 18,24 to create an access opening in the electrical field shielding assembly 10 is described as follows, with reference to FIGS. 3a to 7b.

During normal operation of the VSC sub-modules 16, each second hinge member 24 is in its locked position and each support member 36 is in its retracted position 42, as shown in FIGS. 3a to 3d. The locking member cooperates with one of the support members 36 to selectively maintain this arrangement. The coupling between each second hinge member 24 and the corresponding locking portion 20 of the first hinge member 18 ensures that the second hinge member 24 is inhibited from rotating relative to the first hinge member 18. The faceted edges of each locking portion 20 ensures that the corresponding shielding element 12 is aligned in parallel with the VSC sub-modules 16. In this manner each shielding element 12 is kept in a designated position, i.e. a closed position, within the electrical field shielding assembly 10 to distribute electrical field lines surrounding the VSC sub-modules 16 during their operation.

In order to maintain and/or repair one or more VSC sub-modules 16, access to the VSC sub-modules 16 is required.

Figure 4A:
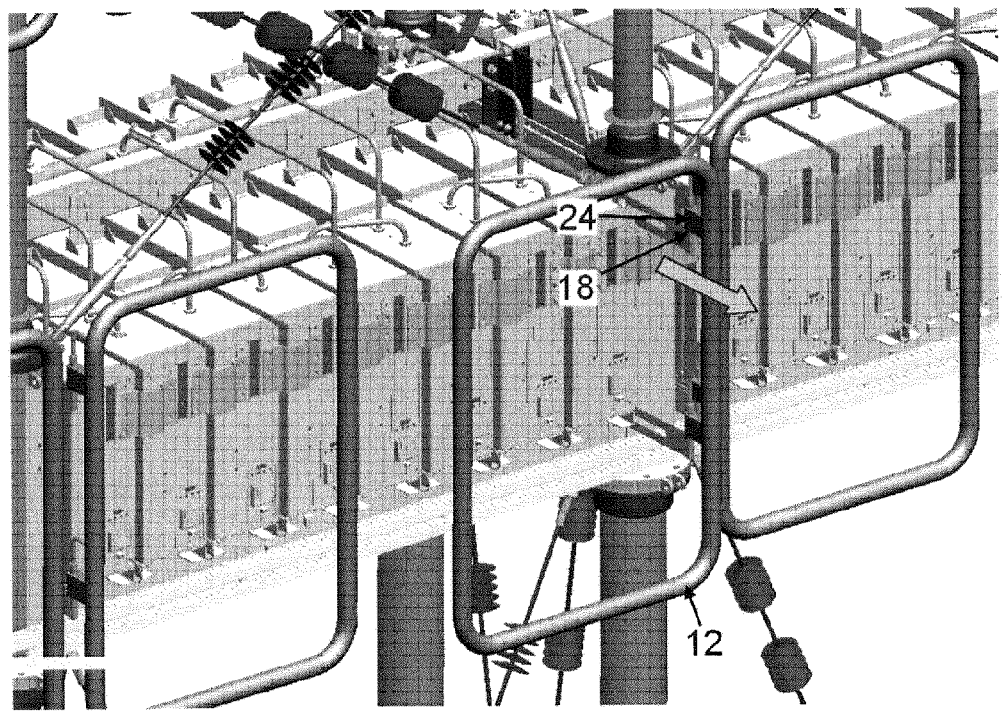
FIGS. 4a and 4b show a configuration of the electrical field shielding assembly of FIG. 1a when the second hinge member is in the locked position and the support member is in an extended position.
Figure 4B:
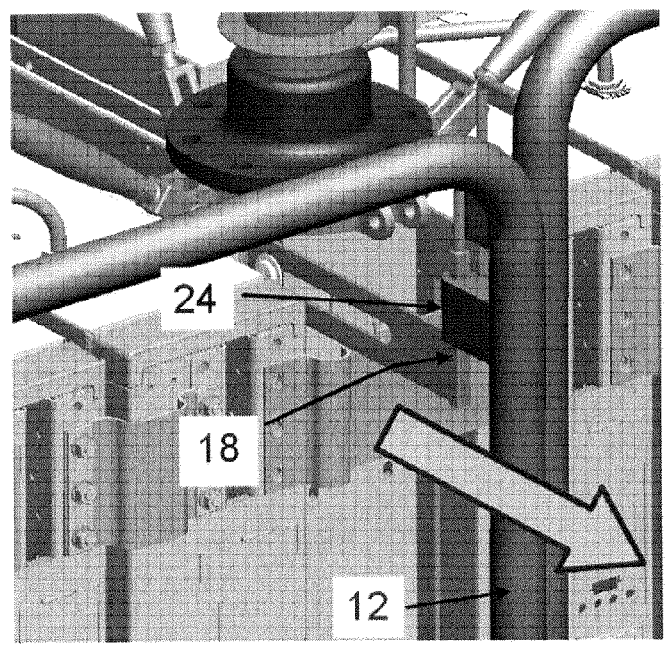
Figure 4C:
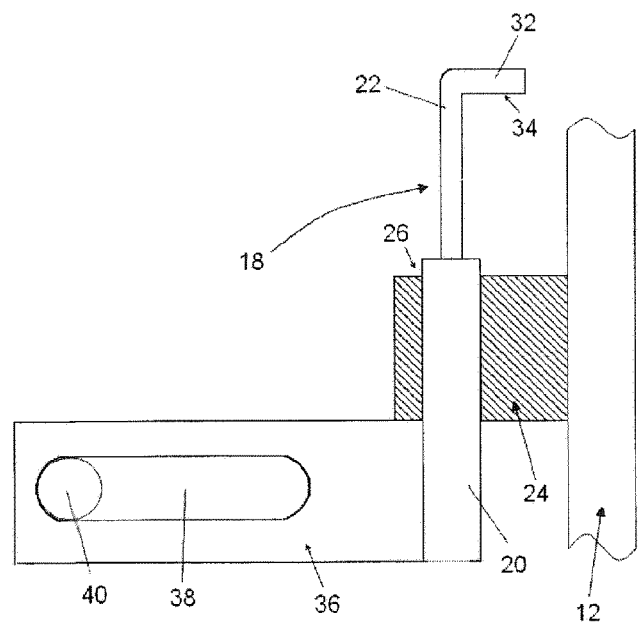
FIG. 4c shows a configuration of the first and second hinge members of FIGS. 4a and 4b.
Figure 5A:
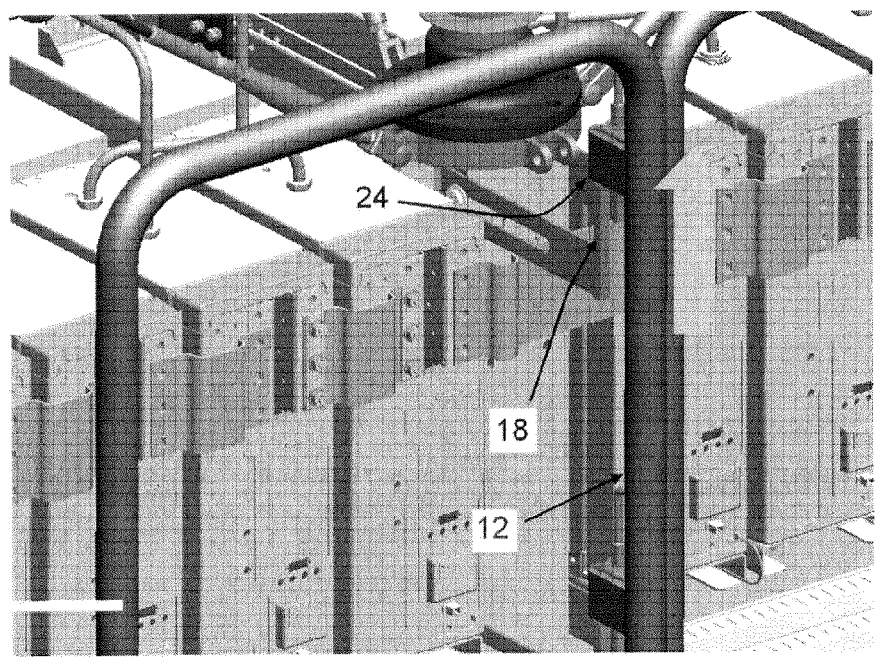
FIG. 5a shows a configuration of the electrical field shielding assembly of FIG. 1a when the second hinge member is in a pivot position and the support member is in the extended position.
Figure 5B:
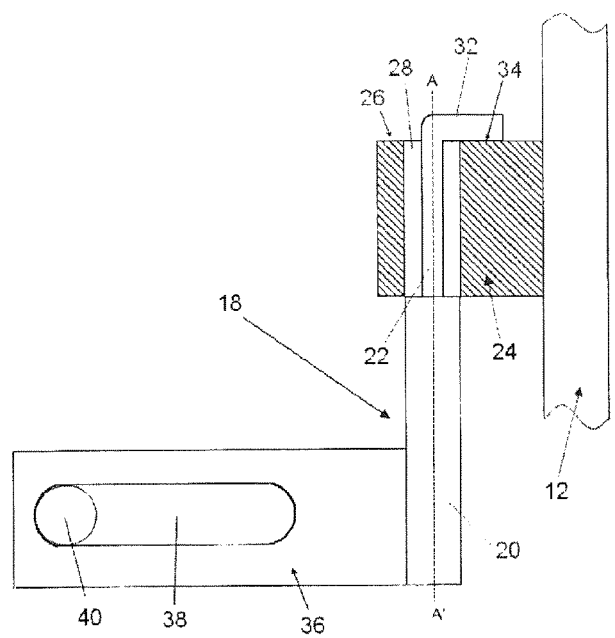
Figure 5C:
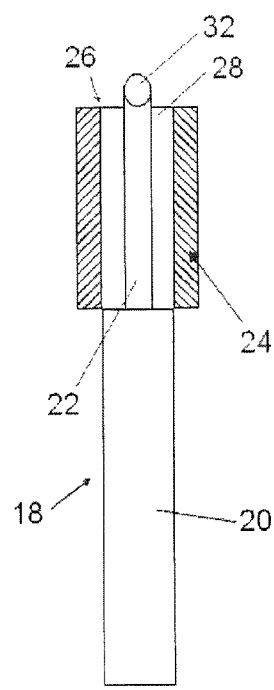
FIG. 5c shows a cross-sectional view of the first and second hinge members along lines A-A' of FIG. 5b.

After turning off the VSC sub-modules 16, a shielding element 12, which surrounds the or each VSC sub-module 16 to be maintained or repaired, is selected. It will be appreciated that a plurality of shielding elements 12, instead of a single shielding element, may be selected in order to access the VSC sub-modules 16. The locking member associated with a given support member 36 is disengaged from the said support member 36 so that the support member 36 that corresponds to the shielding element 12 can be slid to its extended position 44 to form a clearance gap between the shielding element 12 and the electrical field shielding assembly 10, as shown in FIGS. 4a to 4c. During such sliding the resiliently deformable clamping members of the retaining member are disengaged from the portion of the shielding element 12 lying opposite the aforementioned support member 36. The second hinge member 24 of the shielding element 12 is then slid along the axes of the locking and pivot portions 20,22 from its locked position to its pivot position, as shown in FIGS. 5a to 5c.

Figure 6A:
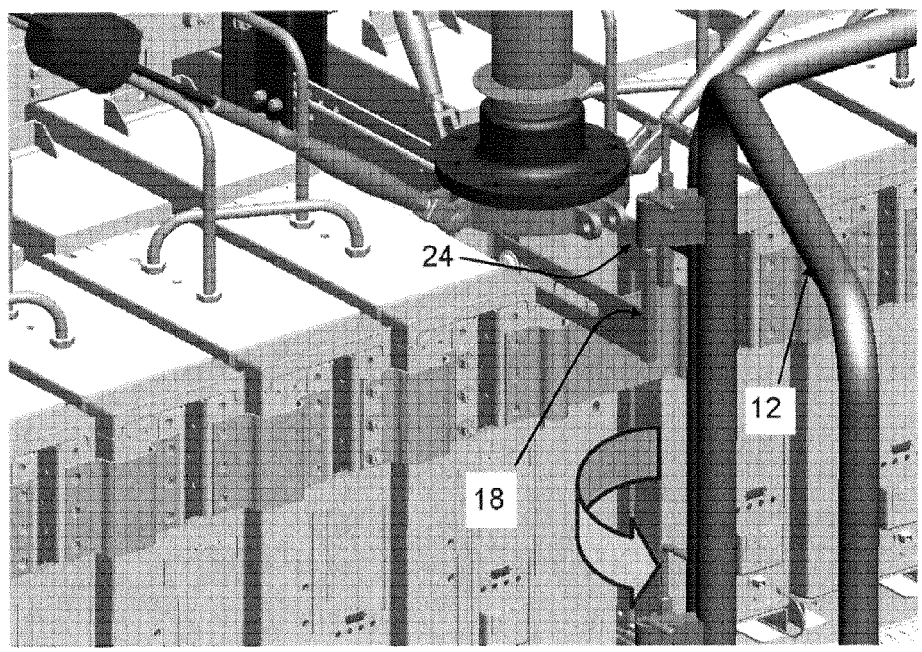
FIG. 6a shows a configuration of the electrical field shielding assembly of FIG. 1a when the second hinge member is rotated relative to the first hinge member to create an access opening in the electrical field shielding assembly.
Figure 6B:
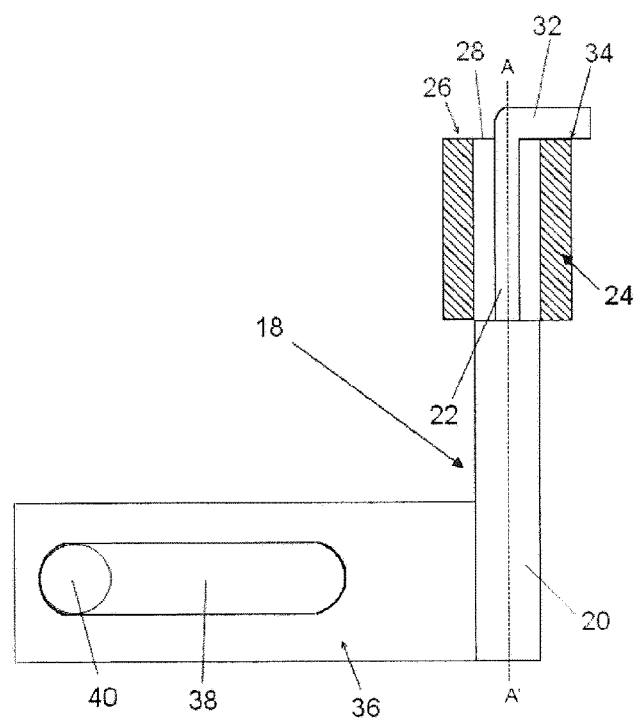
Figure 6C:
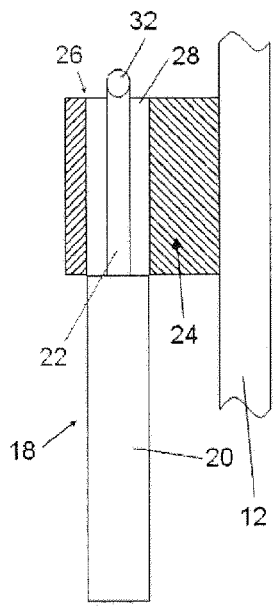
FIG. 6c shows a cross-sectional view of the first and second hinge members along lines A-A' of FIG. 6b.
Figure 7A:
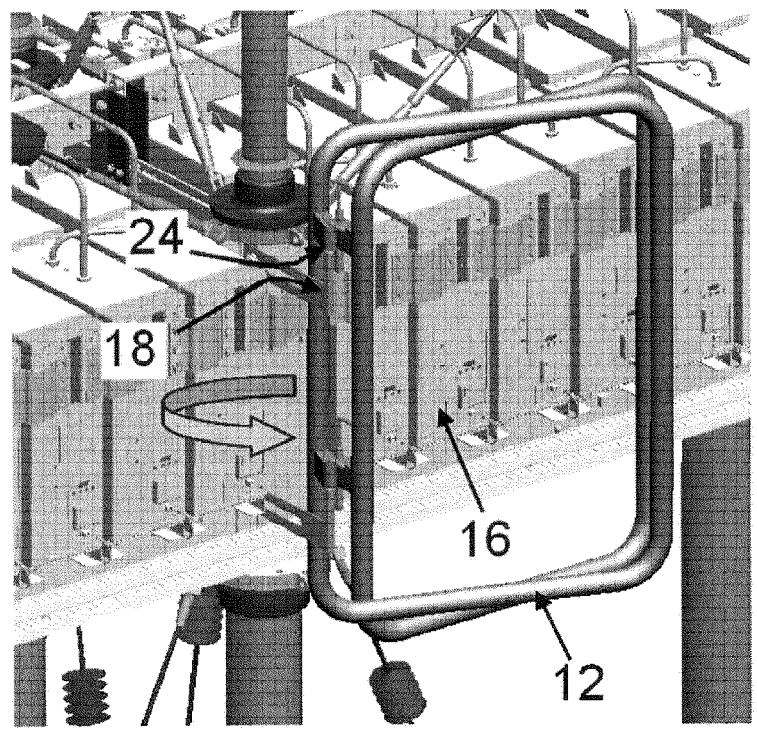
FIG. 7a shows a configuration of the electrical field shielding assembly of FIG. 1a when the shielding element engages a second abutment surface of the support member.
Figure 7B:
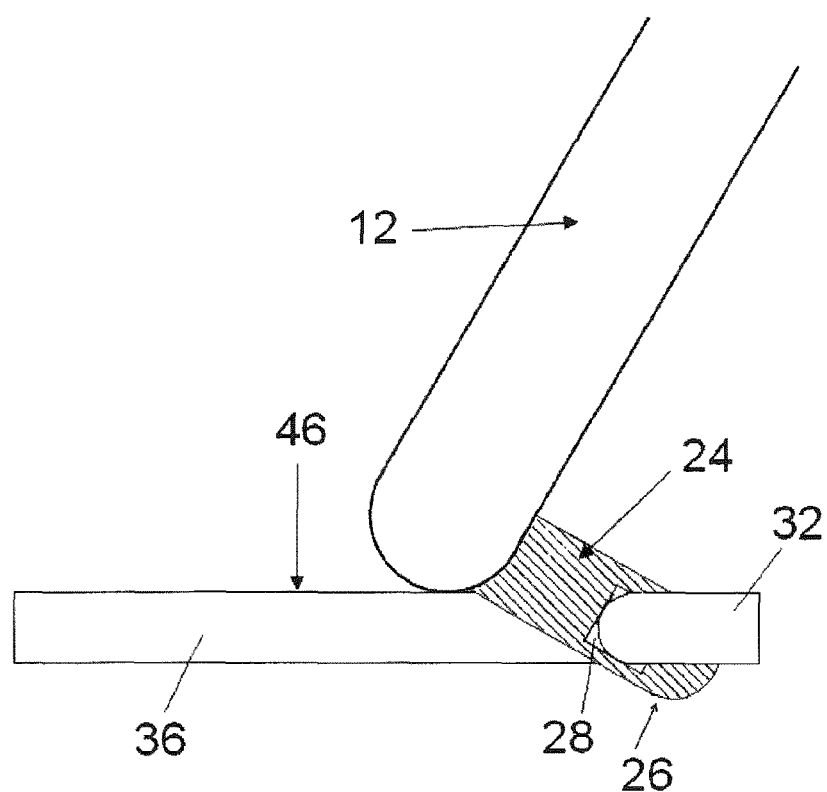

Once the second hinge member 24 is in its pivot position, the second hinge member 24 is rotated relative to the first hinge member 18, as shown in FIGS. 6a to 6c. Rotation of the second hinge member 24 is carried out, until the shielding element 12 engages the second abutment surface 46 of the support member 36, as shown in FIGS. 7a and 7b. In this manner the shielding element 12 is hingably moved to an open position, in which an access opening in the electrical field shielding assembly 10 is created, to thereby enable a user to access the VSC sub-modules 16 for the purposes of maintenance and/or repair.

Meanwhile, when the second hinge member 24 is in its pivot position, the first abutment surface 34 of the stopping portion 32 engages the second hinge member 24 so as to prevent the second hinge member 24 from being detached from the first hinge member 18.

After maintenance and/or repair of the VSC sub-modules 16 is completed and access to the VSC sub-modules 16 is no longer required, the second hinge member 24 is rotated relative to the first hinge member 18 until the shielding element 12 is aligned in parallel with the VSC sub-modules 16. The second hinge member 24 is then slid along the axes of the locking and pivot portions 20,22 from its pivot position to its locked position. Once the locking portion 20 is lockably retained inside the tubular portion 26 of the second hinge member 24, the support member 36 is slid to its retracted position 42 so as to close the access opening and return the shielding element 12 to its designated position, i.e. the closed position, for distributing electrical field lines surrounding the VSC sub-modules 16 during their operation. The locking member is then moved back into engagement with the corresponding support member 36 to hold the shielding element 12 in its closed position. The VSC sub-modules 16 is then turned on to resume normal operation.

The provision of the shielding elements 12 that is hingably mounted on the electrical field shielding assembly 10 therefore results in an electrical field shielding assembly 10 with a plurality of shielding elements 12, each of which is selectively movable to provide access to the VSC sub-modules 16 housed, in use, inside the electrical field shielding assembly 10.

The provision of the shielding elements 12 that is hingably mounted on the electrical field shielding assembly 10 also allows each of the plurality of shielding elements 12 to be secured to the electrical field shielding assembly 10 at all times, and thereby prevents each shielding element 12 from being accidentally dropped when being moved to create an access opening in the electrical field shielding assembly 10. This is particularly advantageous in tall electrical field shielding assemblies with large and heavy shielding elements 12 that are positioned at a high location relative to the ground. Damage to the shielding elements 12 is undesirable, since a change in shape of the shielding elements 12 may lead to redistribution of the electrical field lines that results in high electrical stress about the VSC sub-modules 16.

It is envisaged that, in other embodiments of the invention, one or more shielding elements may be hingably mounted on the electrical field shielding assembly in a different manner to that shown in the above embodiment, in order to permit hinged movement of the or each shielding element relative to the electrical field shielding assembly to create an access opening in the electrical field shielding assembly.

The invention claimed is:

1. An electrical field shielding assembly, for high voltage electrical equipment, comprising at least one electrically conductive, shielding element that is hingably mounted on the electrical field shielding assembly which in use houses electrical equipment, wherein the or each shielding element is hingably movable between an open position in which an access opening in the electrical field shielding assembly is created through which the electrical equipment is accessible and a closed position in which the access opening in the electrical field shielding assembly is closed, the electrical field shielding assembly further including at least one first hinge member, and the or each shielding element including a second hinge member, the or each second hinge member being hingably coupled with the first hinge member or a respective one of the first hinge members, and the or each first hinge member including:
   a locking portion to inhibit rotation of the corresponding second hinge member relative to the first hinge member, and
   a pivot portion to permit rotation of the corresponding second hinge member relative to the first hinge member,
   wherein the or each second hinge member is selectively movable between a locked position in which the or each second hinge member is lockably coupled with the corresponding locking portion, and a pivot position in which the or each second hinge member is rotatably coupled with the corresponding pivot portion.

2. An electrical field shielding assembly according to claim 1 wherein the or each shielding element is shaped and/or arranged to form at least part of a hollow enclosure when in the closed position.

3. An electrical field shielding assembly according to claim 1 wherein the or each pivot portion is cylindrical.

4. An electrical field shielding assembly according to claim 1 wherein the or each locking portion is non-cylindrical.

5. An electrical field shielding assembly according to claim 4 wherein the or each locking portion includes at least one faceted edge.

6. An electrical field shielding assembly according to claim 1 wherein the or each second hinge member includes a tubular portion that encloses the corresponding first hinge member.

7. An electrical field shielding assembly according to claim 6 wherein the tubular portion of the or each second hinge member is slidably coupled with the corresponding first hinge member.

8. An electrical field shielding assembly according to claim 6 wherein the first and second hinge members are shaped to define a gap between the tubular portion and the pivot portion when the second hinge member is in the pivot position, the gap being sized to permit rotation of the second hinge member relative to the first hinge member.

9. An electrical field shielding assembly according to claim 6 wherein the first and second hinge members are shaped to keep the locking portion lockably retained within the tubular portion when the second hinge member is in the locked position.

10. An electrical field shielding assembly according to claim 1 wherein the or each first hinge member further includes a stopping portion with a first abutment surface to engage the corresponding second hinge member so as to keep the corresponding second hinge member in coupling with the pivot portion when the second hinge member is in the pivot position.

11. An electrical field shielding assembly according to claim 1 further comprising at least one support member, the or each shielding element being hingably connected to the support member or a respective one of the support members, the or each support member being movably connected to the electrical field shielding assembly, wherein the or each support member is selectively movable between a retracted position towards the electrical field shielding assembly and an extended position away from the electrical field shielding assembly.

12. An electrical field shielding assembly according to claim 1 further comprising at least one second abutment surface to engage the or each shielding element to limit a maximum hinged movement range of the or each shielding element relative to the electrical field shielding assembly.

13. An electrical field shielding assembly according to claim 11, further comprising at least one second abutment surface to engage the or each shielding element to limit a maximum hinged movement range of the or each shielding element relative to the electrical field shielding assembly, wherein the or each support member defines the second abutment surface or a respective one of the second abutment surfaces.

* * * * *